United States Patent Office 2,883,368
Patented Apr. 21, 1959

2,883,368

AMINO-SUBSTITUTED DICYANOETHYLENES

William J. Middleton, Wilmington, Del., assignor to E. I. du Pont de Nemours and Company, Wilmington, Del., a corporation of Delaware No Drawing. Application August 30, 1954
Serial No. 453,143

10 Claims. (Cl. 260—78.4)

This invention relates to novel chemical compounds and their preparation, particularly amino- substituted dicyanoethylenes and production of them from dicyanoketene acetals.

Dicyanoketene acetals may be characterized by the formula $(NC)_2C=C(OR)_2$, where each R signifies a hydrocarbon radical linked to oxygen and perhaps linked to the other R as well, being monovalent in the first instance and divalent in the second. This structure conveniently may be represented more generally as follows:

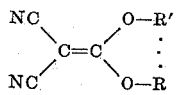

the dotted line indicating the optional bond between hydrocarbon radicals R and R', which may be alike or unlike. Copending patent application of Heckert and Middleton, Serial No. 416,720, filed March 16, 1954, now abandoned (also Middleton et al., J. Am. Chem. Soc. 80, 2788 (1958)), describes preparation of dicyanoketene acetals in the presence of a catalyst (such as urea, metal salt, or tertiary amine) from alcohols and tetracyanoethylene, the latter of which may be formed by reaction of sulfur monochloride and malononitrile as described in Cairns et al. J. Am. Chem. Soc. 80, 2775 (1958). The heterocyclic dicyanoketene acetals (i.e., 2-dicyanomethylene-1,3-dioxacycloaliphatic compounds) suggested above result when dihydric alcohols are reacted with tetracyanoethylene according to Heckert and Middleton.

The primary object of the present invention is preparation of amino-substituted dicyanoethylenes. Another object is provision of new compounds of this class. Other objects will be apparent from the following description of the invention.

In general, the objects of the present invention are accomplished by reaction of at least one equivalent of ammonia or primary or secondary amine with dicyanoketene acetals; thus, a compound as formulated above is reacted with a compound containing one or more amino groups having replaceable hydrogen, and at least one of the carbon-to-oxygen bonds of the acetal breaks and the bond from one replaceable hydrogen to the amino nitrogen breaks, whereupon these carbon and nitrogen atoms link together in the product. The invention comprehends products in which both, as well as those in which only one, of the starting acetal groups are replaced by amino groups; along with aliphatic monomeric compounds, these include polymeric compounds and cyclic monomers.

When an amine being reacted with the dicyanoketene acetal contains more than one primary or secondary amino group per molecule, both acetal groups normally are replaced thereby, giving a heterocyclic product when the amino groups are located close to one another in the molecule or giving a polymeric product when the amino groups are separated considerably from one another in the molecule. When the reactant molecule contains only one amino group having replaceable hydrogen, a product in which only one acetal group is replaced by amine normally is recoverable. In the latter instance, the remaining acetal group is unaffected when the original molecule contained two separate acetal groups; however, when the original molecule had the acetal groups linked carbon-to-carbon with one another to form a dicyanomethyl-substituted dioxa-alicyclic compound, reaction with one amine equivalent leaves the combined hydrocarbon residue attached to the unaffected oxygen, but in hydroxy-substituted form (a 1-amino-2,2-dicyanovinyl hydroxyaliphatic ether). The process of this invention contemplates reaction of starting dicyanoketene acetal produced in situ from the starting materials of Heckert and Middleton, mentioned above, the same result being obtained as if the compound existed separately. The following examples, in which parts and percentages are by weight unless otherwise indicated, illustrate the practice of this invention.

EXAMPLE I

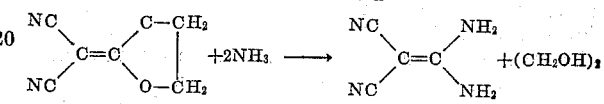

A mixture of 136 parts of dicyanoketene ethylene acetal and 450 parts of concentrated ammonium hydroxide (28.3% $NH_3$ by weight) is heated under reflux for 10 minutes, and then allowed to stand overnight. The white crystalline plates which form are collected on a filter, washed with water, and recrystallized from water. There is obtained 100 parts (93%) of 1,1-diamino-2,2-dicyanoethylene in the form of white needles, M.P. 236–238°C. X-ray diffraction patterns of the crude plates and the recrystallized needles are identical.

*Analysis.*—Calc'd. for $C_4H_4N_4$: C, 44.44; H, 3.73; N, 51.82. Found: C, 44.34; H, 3.86; N, 51.67, 51.52.

Spectral analysis indicates that 1,1-diamino-2,2-dicyanoethylene exists as a tetrasubstituted ethylene, and not as its tautomer, dicyanoacetamidine. A strong ultraviolet absorption maximum at 2510 A. indicates a high degree of resonance. The very characteristic $NH_2$ bands at 6.04 microns, 3.03 microns and 3.15 microns are observed in the infrared absorption spectrum. A band at 6.43 microns which is very similar to the absorption band for C=C in the dicyanoketene acetals is also observed. Absence of C—H bond absorption bands in the spectrum also indicates that the tautomeric dicyanoacetamidine is not present.

1,1-diamino-2,2-dicyanoethylene may be hydrolyzed in aqueous alkali as follows:

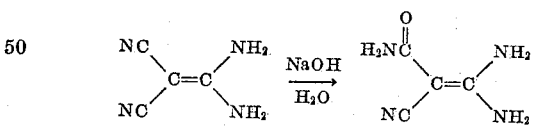

Ten parts of 1,1-diamino-2,2-dicyanoethylene is dissolved in 100 parts of hot 10% sodium hydroxide, the solution is boiled for 5 minutes, and then cooled. A white precipitate forms, which is recrystallized from water. There is obtained 7 parts (60%) of 1,1-diamino-2-cyano-2-carbamylethylene in the form of long white needles, M.P. 204–205° C.

*Analysis.*—Calc'd. for $C_4H_6N_4O$: C, 38.09; H, 4.80; N, 44.43. Found: C, 38.44, 38.52; H, 4.74, 4.88; N, 44.68, 44.80.

EXAMPLE II

Part A

A mixture of 565 parts of dicyanoketene diethyl acetal, 3000 parts of water and 80 parts of an aqueous solution containing 119.17 parts of ammonium hydroxide is heated to boiling. The white crystalline solid which separates upon cooling is collected on a filter, washed with water and recrystallized from ethanol. There is obtained 310 parts (67%) of 1-amino-2,2-dicyanovinyl ethyl ether in the form of white needles, M.P. 225–226° C.

*Analysis.*—Calc'd. for $C_6H_7N_3O$: C, 52.54; H, 5.15; N, 30.64. Found: C, 52.84; H, 5.20; N, 30.65.

The ultraviolet absorption spectrum of 1-amino-2,2-dicyanovinyl ethyl ether shows a strong maximum absorption at 2540 A., which indicates a high degree of conjugation for such a small molecule. There is a doublet at 3.05 and 3.19 microns in the infrared absorption spectrum due to the $NH_2$ bonds. There is also a very strong and sharp band at 6.05 microns which is probably associated with the $NH_2$ group, and a band at 6.48 microns which is very similar to the absorption band for C=C in dicyanoketene dimethyl acetal.

*Alternative procedure for Part A*

A mixture of 64 parts of tetracyanoethylene, 30 parts of urea, and 395 parts of ethyl alcohol is heated until the purple color which first forms had faded to yellow. Concentrated ammonium hydroxide, 225 parts, and 750 parts of water are added to the warm solution and heating is continued for 10 minutes. The light brown precipitate which forms upon cooling is collected on a filter, washed with water and recrystallized from water containing decolorizing carbon. There is obtained 15 parts (22%) of 1-amino-2,2-dicyanovinyl ethyl ether in the form of white needles, M.P. 225–226° C.

*Analysis.*—Calc'd. for $C_6H_7N_3O_2$: C, 52.54; H, 5.15; N, 30.64. Found: C, 52.68, 52.53; H, 5.17, 5.19; N, 30.85, 30.80.

*Part B*

A mixture of 68 parts of 1-amino-2,2-dicyanovinyl ethyl ether, 43 parts of piperidine and 500 parts of water is heated under reflux for 30 minutes. Upon cooling the clear solution, a white precipitate forms. The precipitate is collected on a filter, washed with water, and recrystallized from water. There is obtained 53 parts (60%) of 1-amino-1-piperidino-2,2-dicyanoethylene in the form of white needles, M.P. 160–161° C.

*Analysis.*—Calc'd. for $C_9H_{12}N_4$: C, 61.34; H, 6.87; N, 31.80. Found: C, 61.58, 61.17; H, 6.41, 7.02; N, 31.54, 31.50.

EXAMPLE III

A mixture of 166 parts of dicyanoketene diethyl acetal and 900 parts of concentrated ammonium hydroxide (28.3% $NH_3$ by weight) is heated under reflux for 2.5 hours. The white solid which precipitates upon cooling is recrystallized from water to give 87 parts (81%) of 1,1-diamino-2,2-dicyanoethylene in the form of white needles, M.P. 234–236° C. The infrared absorption spectrum of this compound is identical with that of the compound prepared from dicyanoketene ethylene acetal and ammonia as shown in Example I.

EXAMPLE IV

A mixture of 136 parts of dicyanoketene ethylene acetal and 200 parts of an aqueous solution containing 25% methylamine is heated at its boiling temperature until all of the solid has dissolved. The precipitate which forms upon cooling is collected on a filter, washed with water and recrystallized from a very small amount of water. There is obtained 40 parts (30%) of 1,1-bis(methylamino)-2,2-dicyanoethylene in the form of white needles, M.P. 160–163° C.

*Analysis.*—Calc'd. for $C_6H_8N_4$: C, 52.93; H, 5.92; N, 41.15. Found: C, 53.08, 53.27; H, 6.05, 5.95; N, 41.39, 41.29.

The infrared absorption spectrum contains a N—H band at 3.0 microns.

EXAMPLE V

*Part A*

A mixture of 525 parts of dicyanoketene diethyl acetal, 2000 parts of water and 420 parts of an aqueous solution containing 98.15 parts of methylamine is heated until solution is complete. Upon cooling, a white crystalline mass separates. This material is collected on a filter, washed with water and recrystallized from water. There is obtained 350 parts (86%) of 1-methylamino-2,2-dicyanovinyl ethyl ether in the form of white plates, M.P. 98–99° C. This compound is slightly acidic as shown by the fact it dissolves in a sodium hydroxide solution but not in a sodium bicarbonate solution.

*Analysis.*—Calc'd. for $C_7H_9ON_3$: C, 55.62; H, 6.00; N, 27.80. Found: C, 55.56, 55.21; H, 6.20, 6.11; N, 27.74, 27.67.

The infrared absorption spectrum of this compound indicates an N—H band at 3.05 microns.

*Part B*

A solution of 75 parts of 1-methylamino-2,2-dicyanovinyl ethyl ether in 900 parts of concentrated ammonium hydroxide is heated under reflux for 10 minutes. The solution is cooled, and a white solid precipitates. The solid is collected on a filter, washed with water and recrystallized from water. There is obtained 51 parts (84%) of 1-amino-1-methylamino-2,2-dicyanoethylene in the form of white crystals, M.P. 198–200° C.

*Analysis.*—Calc'd. for $C_5H_6N_4$: C, 49.17; H, 4.95; N, 45.88. Found: C, 49.18, 49.38; H, 4.99, 5.04; N, 45.60, 45.26.

EXAMPLE VI

A solution of 136 parts of dicyanoketene ethylene acetal in 1360 parts of dimethylamine is allowed to evaporate overnight at room temperature. The residue is dissolved in 1000 parts of hot water and heated on a steam bath for 10 minutes. The white needles which form upon cooling are collected on a filter, washed with water and recrystallized from water. There is obtained 85 parts (52%) of 1,1-bis(dimethylamino)-2,2-dicyanoethylene in the form of long white needles, M.P. 129–130° C.

*Analysis.*—Calc'd. for $C_8H_{12}N_4$: C, 58.51; H, 7.37; N, 34.12. Found: C, 58.55, 58.38; H, 7.21, 7.35; N, 34.06, 34.23.

There are no bands due to N—H or $NH_2$ present in the infrared absorption spectrum. A band at 6.55 microns indicates the presence of a C=C bond.

EXAMPLE VII

Ethylenediamine, 120 parts, is added slowly to a solution of 272 parts of dicyanoketene ethylene acetal in 2220 parts of tetrahydrofuran. The mixture becomes warm, and a light yellow precipitate forms. This precipitate is collected on a filter, washed with tetrahydrofuran and then recrystallized from water. There is obtained 210 parts (79%) of 2-(dicyanomethylene)-imidazolidine in the form of white prisms, M.P. 279–280° C.

*Analysis.*—Calc'd. for $C_6H_6N_4$: C, 53.72; H, 4.51; N, 41.77; M.W., 134. Found: C, 54.01; H, 4.51; N, 41.65, 41.62; M.W. 144, 145.

2-(dicyanomethylene)-imidazolidine may be hydrolyzed in aqueous caustic as follows. A mixture of 20 parts of 2-(dicyanomethylene)-imidazolidine and 200 parts of 10% aqueous sodium hydroxide is heated under reflux for one hour. All of the solid dissolves. The white precipitate which forms upon cooling is collected on a filter, washed with water and recrystallized from 200 parts of 10% sodium hydroxide solution. There is obtained 16 parts of 2-(carbamylcyanomethylene)-imidazolidine in the form of long white needles, M.P. 241–243° C.

*Analysis.*—Calc'd. for $C_6H_8N_4O$: C, 47.36; H, 5.30; N, 36.83. Found: C, 47.39, 47.47; H, 5.15, 5.43; N, 36.84, 36.97.

EXAMPLE VIII

A mixture of 128 parts of tetracyanoethylene, 528 parts of trimethylene glycol and 10 parts of urea is heated until all of the solid is dissolved. The solution is cooled, and 60 parts of ethylenediamine is added slowly. The reaction mixture is mixed with 500 parts of water, and the light tan precipitate which forms is collected on a filter and washed with water. The product is recrystallized from dimethylformamide-water to give 95 parts (70%) of 2-(dicyanomethylene)-imidazolidine in the form of a crystalline white powder, M.P. 273–274° C.

*Analysis.*—Calc'd. for $C_6H_6N_4$: C, 53.72; H, 4.51; N, 41.77. Found: C, 54.08; H, 4.64; N, 41.99, 42.10.

The infrared spectrum of this compound agrees with that of the product prepared from dicyanoketene ethylene acetal and ethylenediamine as in the previous example.

EXAMPLE IX

A mixture of 136 parts of dicyanoketene ethylene acetal, 235 parts of an aqueous solution containing 35 parts of ammonium hydroxide and 1000 parts of water is heated until solution is complete. The white crystalline solid which separates upon cooling is collected on a filter, washed with water and recrystallized from water. There is obtained 90 parts (60%) of 1-amino-1-(2-hydroxyethoxy)-2,2-dicyanoethylene (1-amino-2,2-dicyanovinyl 2-hydroxyethyl ether) in the form of white needles, M.P. 164–165° C.

*Analysis.*—Calc'd. for $C_6H_7N_3O_2$: C, 47.05; H, 4.61; N, 27.44. Found: C, 47.34, 46.73; H, 4.89, 4.69; N, 27.25, 27.58.

EXAMPLE X

A mixture of 15 parts of dicyanoketene trimethylene acetal and 45 parts of concentrated ammonium hydroxide is heated until all of the solid has dissolved. The white crystalline solid which forms upon cooling is collected on a filter, washed with water and recrystallized from water. There is obtained 11 parts (66%) of 1-amino-1-(3-hydroxypropoxy) - 2,2-dicyanoethylene (1-amino-2,2-dicyanovinyl 3-hydroxypropyl ether) in the form of white plates, M.P. 166–167° C.

*Analysis.*—Calc'd. for $C_7H_9N_3O_2$: C, 50.29; H, 5.43; N, 25.14. Found: C, 50.17, 50.30; H, 5.52, 5.58; N, 25.10, 25.01.

EXAMPLE XI

A solution of 186 parts of dicyanoketene ethylene acetal and 159 parts of hexamethylenediamine in 888 parts of tetrahydrofuran is allowed to stand at room temperature for 18 hours. The tough, rubbery polymer which separates out is washed with hot water and dried. The polymer is not tacky and is insoluble in organic solvents; it consists predominantly of poly[(dicyanomethylene)-methazihexazamer], indicated by the following structural formula:

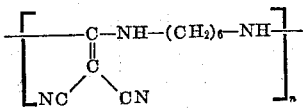

The 1-amino-2,2-dicyanovinyl ethers indicated below in Table I are obtained when the starting materials shown are reacted according to the first part of Examples II or V or according to Example IX or Example X.

TABLE I

| Run | Starting materials | | Product |
|---|---|---|---|
| | Dicyanoketene acetal | Amine (1 equivalent) | 1-amino-2,2-dicyanovinyl ether |
| A | dicyanoketene ethylene acetal [2-dicyanomethylene-1,3-dioxolane] (NC)₂C=C(O-CH₂)(O-CH₂) | piperidine | 1-(2-hydroxyethoxy)-1-piperidino-2,2-dicyanoethylene [1-piperidino-2,2-dicyanovinyl 2-hydroxyethyl ether] |
| B | dicyanoketene 2,2-dimethyl-trimethylene acetal [2-dicyanomethylene-5,5-dimethyl-1,3-dioxane] | $H_2N(CH_2)_{17}CH_3$ octadecylamine | 1-(2,2-dimethyl-3-hydroxypropoxy)-1-octadecyl-amino-2,2-dicyanoethylene [1-octadecylamino-2,2-dicyanovinyl 2,2-dimethyl-3-hydroxypropyl ether] |
| C | dicyanoketene 1,2-dipropyl-ethylene acetal [2-dicyanomethylene-4,5-dipropyl-1,3-dioxolane] | $HN(C_4H_9)_2$ dibutylamine | 1-(1,2-dipropyl-2-hydroxyethoxy)-1-dibutylamino-2,2-dicyanoethylene [1-dibutylamino-2,2-dicyanovinyl 1,2-dipropyl-2-hydroxyethyl ether] |
| D | dicyanoketene 1,2-(4-cyclohexene)ylene acetal [3,4-(dicyanomethylene)-methylenedioxy-1-cyclohexene] | $H_2N-CH_2-C_6H_5$ benzylamine | 1-benzylamino-2,2-dicyanovinyl 6-hydroxy-3-cyclohexenyl ether |
| E | dicyanoketene diallyl acetal | $H_2N(CH_2)_2OH$ ethanolamine | 1-β-hydroxyethylamino-1-allyloxy-2,2-dicyano-ethylene [1-β-hydroxyethylamino-2,2-dicyanovinyl allyl ether] |

The 1,1-diamino-2,2-dicyanoethylenes indicated as products in Table II are obtained by the reaction of a dicyanoketene acetal with two equivalents of an amine as in the processes of Examples I, III, IV, VI, VII and VIII, or by the two-step process of reaction of a dicyanoketene acetal with successive single equivalents of two different amines as in the process methods of Examples II and V.

at their normal melting temperatures, which for many of them are substantially above 200° C. Thus, although 1,2-diamino-1,2-dicyanoethylene decomposes at its melting point of about 180° C. (v. Woodward Patent 2,449,441), 1,1-diamino-2,2-dicyanoethylene is stable up to and even above 235° C.

The above exemplification of this invention shows that the required chemical reactions take place under mild,

TABLE II

| Run | Dicyanoketene acetal | Amine (or amines) | 1,1-diamino-2,2-dicyanoethylene |
| --- | --- | --- | --- |
| A | dicyanoketene dimethyl acetal | $H_2N(CH_2)_{17}CH_3$ <br> octadecylamine | 1,1-bis(octadecylamino)-2,2-dicyanoethylene |
| B | dicyanoketene diethyl acetal | $(C_2H_5)NH(CH_2)_3NH_2$ <br> N-ethyltrimethylenediamine | 1-ethyl-2-(dicyanomethylene)hexahydropyrimidine |
| C | dicyanoketene ethylene acetal | piperazine | 1,4-diaza-7-(dicyanomethylene)-bicyclo[2,2,1]heptane [N,N'-(2,2-dicyanovinylidine)piperazine] |
| D | dicyanoketene trimethylene acetal | $H_2N-CH_2-CH=CH_2$ <br> allylamine <br> cyclopentylamine | 1-allylamino-1-cyclopentylamino-2,2-dicyanoethylene |
| E | dicyanoketene dimethyl acetal | $H_2N-CH_2-CH(CH_3)-CHNH_2-CH_3$ <br> 1,3-diamino-2-methylbutane | 2-dicyanomethylene-4,5-dimethylhexahydropyrimidine |
| F | dicyanoketene ethylene acetal | $H_2N-CH_2-CH(C_6H_5)-CHNH_2-CH_2(C_6H_5)$ <br> 1,3-diamino-2,4-diphenylbutane | 4-benzyl-2-dicyanomethylene-5-phenylhexahydropyrimidine |

The 1,1-diamino-2,2-dicyanoethylenes of the present invention differ sharply from known 1,2-diamino-1,2-dicyanoethylenes with which they are isomeric. For example, 1,1-diamino-2,2-dicyanoethylene itself is neutral, exhibiting pH of about 7 in aqueous solution; whereas the isomeric tetramer of hydrogen cyanide variously described as 1,2-diamino-1,2-dicyanoethylene or 1,2-dicyano-1-amino-2-iminoethane (or an equilibrium mixture of these two) is monobasic, forming a stable monohydrochloride that can be isolated readily (Hinkel, Richards and Thomas, J. Chem. Soc. 1937, 1436). A further distinction of these products is their increased thermal stability as compared with that of known isomers. The 1,1-diamino-2,2-dicyanoethylenes are thermally stable easily obtainable conditions. Ordinary room temperature usually suffices, as does atmospheric pressure. Pressure above or below atmospheric may be employed without hindering the reaction; the rate of reaction normally increases with increasing temperature, which may be provided through external heating or may result from heat of reaction, and temperatures up to 100° C. or so are economically useful in speeding the reaction. Presence of water (v. Examples I to V, inclusive) is acceptable and convenient during the reaction; an organic solvent may be used, instead (v. Examples VII and XI); or the reaction may be carried out in the absence of added liquid (v. Example VI). Except where the dicyanoketene acetal is formed in situ, no catalyst is required.

Many different starting materials are exemplified above for both kind of reactants: (1) dicyanoketene acetal and (2) amine. The acetals include acyclic and heterocyclic compounds, either completely saturated or partly unsaturated, as do the amines, which also may be aryl-substituted. Reaction of an acetal group of the same molecule with another amine greatly increases the variety of available products, as suggested in Table II. When only one acetal group has reacted, the product may be formularized generally as follows:

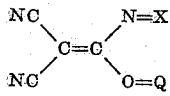

where X stands for either a divalent hydrocarbon radical or for a pair of monovalent radicals each of which is either hydrogen or a hydrocarbon radical (i.e., two hydrogens, two monovalent hydrocarbon radicals, or one hydrogen and one monovalent hydrocarbon radical, both attached to the nitrogen); and Q stands for either the original hydrocarbon radical of the acetal in that position or for a hydroxy-substituted aliphatic hydrocarbon radical made up of a divalent hydrocarbon radical originally connected to both oxygens, i.e., —R—R'—OH. However, where the amine reactant is at least difunctional, this intermediate product usually is not isolated; instead, removal of both acetal groups gives either a monomeric product of relatively low molecular weight or a polymeric product of relatively high molecular weight. A monomer results when the second reactant is a diamine of formula:

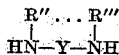

where Y is a divalent hydrocarbon radical containing a chain of as many as three carbon atoms, and R" and R'" when linked together constitute a divalent hydrocarbon radical and when separate from one another constitute individual hydrogen or monovalent hydrocarbon radicals; a polymer results when the second reactant is a diamine of formula:

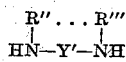

which differs from the above diamine only by having Y' (instead of Y) a divalent hydrocarbon radical containing a chain of at least four carbon atoms. The monomer may be formularized generally (v. Table II: B, C, E, and F) as follows:

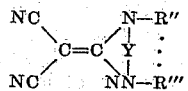

and the polymer (v. Example XI) as follows:

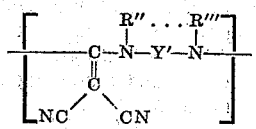

The ready formation of the above cyclic monomeric products, which are medium- or low-melting solids and are especially useful as additives for lubricating oils, particularly those with an aromatic base in which the cyclic monomers are most soluble, and as accelerating agents for the curing of rubber, presumably is attributable to the stability of the 5- and 6-member ring structure (imidazolidine and hexahydropyrimidine) contained therein. On the other hand, the polymers resulting from longer diamines (e.g., hexamethylene, decamethylene, dodecamethylene) have generally higher melting points and are tough and pliable; when coated onto cloth, as by a calender, they adapt it to use in upholstery materials characterized by increased stain resistance and other desirable properties. Many of the products of this invention are highly useful as chemical intermediates; for example, aqueous caustic converts 1,1-diamino-2,2-dicyanoethylenes to corresponding 1,1-diamino-2-carbamyl-2-cyanoethylenes (v. Examples I and VII), which are known to be useful for removing metal ions from solution as chelates: cupric ion forming green chelates with 1,1 - diamino - 2 - cyano - 2-carbamylethylene (Example I)—ferric ion instead forming therewith a deep red-brown chelate—and with 2-(carbamylcyanomethylene)-imidazolidine (Example VII) of the following respective probable formulas:

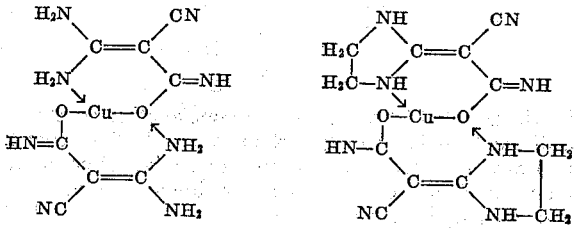

The 1,1-amino-2,2-dicyanoethylenes themselves, particularly those in which the amino group is aliphatic-substituted (v. Examples IV-VI, inclusive) are useful as additives to lubricating oils and as accelerants in the curing of rubber. Many other uses for the products of the present invention will come readily to mind upon appreciation of their novel structure and accompanying physical and chemical characteristics.

The claimed invention:

1. The process which comprises treating a dicyanoketene acetal of the formula

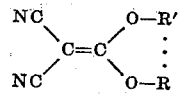

in which R and R' when linked to one another constitute a divalent aliphatic hydrocarbon group having from 2 to 3 carbon atoms in the hydrocarbon chain and not more than a total of 6 carbon atoms substituted on said chain and when separate from one another constitute individual monovalent aliphatic hydrocarbon radicals of the group consisting of lower alkyl and allyl, with a nitrogen-containing compound selected from the group consisting of ammonia, primary and secondary monoamines having from 1 to 18 carbon atoms and primary and secondary diamines having from 1 to 16 carbon atoms, whereby at least one of the carbon to oxygen bonds of the acetal is broken and replaced by a single bond from the same carbon to amino nitrogen of the nitrogen-containing compound at the expense of a hydrogen-to-nitrogen bond in said nitrogen-containing compound.

2. The process which comprises treating a dicyanoketene acetal of the formula

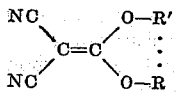

in which R and R' when linked to one another constitute a divalent aliphatic hydrocarbon radical having from 2 to 3 carbon atoms in the hydrocarbon chain and not more than a total of 6 carbon atoms substituted on said chain and when separate from one another constitute individual monovalent aliphatic hydrocarbon radicals of the group consisting of lower alkyl and allyl, with an amine of the formula

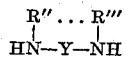

wherein Y constitutes a divalent hydrocarbon radical containing a chain of from 1 to 3 carbon atoms and R" and R'" when linked to one another constitute a divalent aliphatic hydrocarbon radical of the group consisting of lower alkylene and substituted lower alkylene, the substituents on said substituted lower alkylene being of the group consisting of lower alkyl, phenyl and benzyl radicals, and R" and R'" when separate from one another constitute individual monovalent radicals from the group consisting of hydrogen and monovalent aliphatic hydrocarbon radicals having from 1 to 18 carbon atoms, to produce a cyclic compound of the formula $$\begin{array}{c} NC \\ \phantom{NC} \diagdown \\ \phantom{NCC}C=C \\ NC \diagup \end{array} \begin{array}{c} N-R'' \\ \diagup \phantom{X} \\ Y \\ \diagdown \\ N-R''' \end{array}$$

3. The process which comprises treating a dicyanoketene acetal of the formula $$\begin{array}{c} NC \\ \phantom{NC}\diagdown \\ \phantom{NCC}C=C \\ NC\diagup \end{array}\begin{array}{c} O-R' \\ \diagup \\ \diagdown \\ O-R \end{array}$$

in which R and R' when linked to one another constitute a divalent aliphatic hydrocarbon radical having from 2 to 3 carbon atoms in the hydrocarbon chain and not more than a total of 6 carbon atoms substituted on said chain and when separate from one another constitute individual monovalent aliphatic hydrocarbon radicals of the group consisting of lower alkyl and allyl, with an equal molecular portion of an amine of the formula $$\begin{array}{cc} R'' & R''' \\ | & | \\ HN-Y'-NH \end{array}$$

wherein Y' constitutes a divalent hydrocarbon radical containing a chain of at least 4 carbon atoms and R'' and R''' constitute individual monovalent radicals from the group consisting of hydrogen and hydrocarbon radicals having from 1 to 18 carbon atoms, to produce a polymeric compound containing a recurring divalent unit of the formula $$\begin{array}{c} R'' \phantom{XX} R''' \\ | \phantom{XXX} | \\ -C-N-Y'-N- \\ \| \\ C \\ \diagup \diagdown \\ NC \phantom{XX} CN \end{array}$$

4. The process which comprises treating a heterocyclic dicyanoketene acetal of the formula $$\begin{array}{c} NC \\ \diagdown \\ C=C \\ \diagup \\ NC \end{array}\begin{array}{c} O-R' \\ \diagup \phantom{X} | \\ \diagdown \phantom{X} | \\ O-R \end{array}$$

in which —R—R— is a divalent aliphatic hydrocarbon radical having from 2 to 3 carbon atoms in the hydrocarbon chain and containing a total of not more than 6 carbon atoms substituted on said chain, with an equimolecular proportion of an amine of the formula HN=X, wherein X is selected from the class consisting of lower alkylene radicals, substituted lower alkylene radicals, the substituents on said substituted lower alkylene radicals being members of the group consisting of lower alkyl, phenyl and benzyl, and pairs of separate monovalent radicals of the group consisting of hydrogen and hydrocarbon radicals having from 1 to 18 carbon atoms, to produce a compound of the formula $$\begin{array}{c} NC \\ \diagdown \\ C=C \\ \diagup \\ NC \end{array}\begin{array}{c} N=X \\ \diagup \\ \diagdown \\ O-R-R'-OH \end{array}$$

5. The process which comprises treating a dicyanoketene acetal of the formula $$\begin{array}{c} NC \\ \diagdown \\ C=C \\ \diagup \\ NC \end{array}\begin{array}{c} O-R' \\ \diagup \\ \diagdown \\ O-R \end{array}$$

in which R and R' are monovalent aliphatic hydrocarbon radicals of the group consisting of lower alkyl and allyl, with an equimolecular proportion of a nitrogen-containing compound of the formula HN=X wherein the X substituent is selected from the class consisting of lower alkylene radicals, substituted lower alkylene radicals in which the substituent groups are members of the class consisting of lower alkyl, phenyl and benzyl, and pairs of separate monovalent radicals of the group consisting of hydrogen and hydrocarbon radicals of from 1 to 18 carbon atoms, to produce a compound of the formula $$\begin{array}{c} NC \\ \diagdown \\ C=C \\ \diagup \\ NC \end{array}\begin{array}{c} N=X \\ \diagup \\ \diagdown \\ O-R \end{array}$$

6. The process which comprises treating a 1-amino-2,2-dicyanovinyl ether selected from the group consisting of compounds of the formula $$\begin{array}{c} NC \\ \diagdown \\ C=C \\ \diagup \\ NC \end{array}\begin{array}{c} N=X \\ \diagup \\ \diagdown \\ O-R \end{array}$$

and $$\begin{array}{c} NC \\ \diagdown \\ C=C \\ \diagup \\ NC \end{array}\begin{array}{c} N=X \\ \diagup \\ \diagdown \\ O-R-R'-OH \end{array}$$

where R is a monovalent aliphatic hydrocarbon radical of the group consisting of lower alkyl and allyl radicals and —R—R' is a divalent aliphatic hydrocarbon radical having from 2 to 3 carbon atoms in the hydrocarbon chain and containing not more than a total of 6 carbon atoms substituted on said chain, with an equimolecular proportion of a nitrogen-containing compound of the formula HN=Z to produce a compound of the formula $$\begin{array}{c} NC \\ \diagdown \\ C=C \\ \diagup \\ NC \end{array}\begin{array}{c} N=X \\ \diagup \\ \diagdown \\ N=Z \end{array}$$

wherein X and Z in the above formulas are selected from the class consisting of divalent hydrocarbon radicals of the group consisting of lower alkylene radicals, substituted lower alkylene radicals, the substituents on said substituted lower alkylene radicals being members of the class consisting of lower alkyl, phenyl and benzyl, and pairs of monovalent radicals the group consisting of hydrogen and hydrocarbon radicals of 1 to 18 carbon atoms.

7. A cyclic compound of the formula $$\begin{array}{c} NC \\ \diagdown \\ C=C \\ \diagup \\ NC \end{array}\begin{array}{c} N-R'' \\ \diagup \phantom{X} | \\ Y \\ \diagdown \phantom{X} | \\ N-R''' \end{array}$$

where Y constitutes a divalent hydrocarbon radical containing a chain of from 1 to 3 carbon atoms and R'' and R''' when linked to one another constitute a divalent aliphatic hydrocarbon radical of the group consisting of lower alkylene and substituted lower alkylene radicals the substituents on the substituted alkylene group being members of the class consisting of lower alkyl, phenyl and benzyl radicals, and when separate from one another R'' and R''' constitute individual monovalent radicals of the class consisting of hydrogen and hydrocarbon radicals having from 1 to 18 carbon atoms.

8. A polymeric compound containing a recurring divalent unit of the formula $$\begin{array}{c} R'' \phantom{XX} R''' \\ | \phantom{XXX} | \\ -C-N-Y'-N- \\ \| \\ C \\ \diagup \diagdown \\ NC \phantom{XX} CN \end{array}$$

wherein Y' constitutes a divalent hydrocarbon radical containing a chain of at least 4 carbon atoms, and R'' and R''' constitute individual monovalent radicals selected from the group consisting of hydrogen and hydrocarbon radicals having from 1 to 18 carbon atoms.

9. A compound of the formula $$\begin{array}{c} NC \\ \diagdown \\ C=C \\ \diagup \\ NC \end{array}\begin{array}{c} N=X \\ \diagup \\ \diagdown \\ O-R-R'-OH \end{array}$$

in which —R—R'— is a divalent aliphatic hydrocarbon radical having from 2 to 3 carbon atoms in the hydrocarbon chain and not more than 6 carbon atoms substituted on said chain and X is selected from the class consisting of lower alkylene, substituted lower alkylene wherein the substituents thereon are selected from the group consisting of lower alkyl, phenyl and benzyl, and pairs of separate monovalent radicals of the group consisting of hydrogen and monovalent hydrocarbon radicals having from 1 to 18 carbon atoms.

10. A compound of the formula

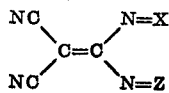

wherein X and Z are selected from the class consisting of lower alkylene, substituted lower alkylene in which the substituents are members of the class consisting of lower alkyl, phenyl and benzyl, and pairs of separate monovalent radicals from the group consisting of hydrogen and hydrocarbon radicals of from 1 to 18 carbon atoms.

References Cited in the file of this patent

UNITED STATES PATENTS 2,422,598    Stiller _____ June 17, 1947

OTHER REFERENCES

Linstead: J. Chem. Soc., 1937, page 920.

UNITED STATES PATENT OFFICE
Certificate of Correction

Patent No. 2,883,368                          April 21, 1959

William J. Middleton

It is hereby certified that error appears in the printed specification of the above numbered patent requiring correction and that the said Letters Patent should read as corrected below.

Column 2, lines 19 to 22, Example I, for the first reactant in equation reading:

column 2, line 68, Example II, for "80 parts" read —800 parts—; column 8, line 5, for the patent number "2,449,441" read —2,499,441—; columns 7 and 8, Table II, second column thereof, under the heading "Amine (or amines)", opposite Run "B", for

"$(C_2H_4)NH(CH_2)_3NH_2$"

read —$(C_2H_5)NH(CH_2)_3NH_2$—; column 9, lines 49 to 52, for the formula reading:

column 11, line 45, for "—R—R—" read ——R—R'———; column 12, line 39, for "radicals the" read —radicals of the—.

Signed and sealed this 25th day of August 1959.

[SEAL]

Attest:
KARL H. AXLINE,
*Attesting Officer.*

ROBERT C. WATSON,
*Commissioner of Patents.*